G. BELZ.
MOTOR ATTACHMENT FOR BICYCLES.
APPLICATION FILED AUG. 17, 1908.
928,928.
Patented July 27, 1909.
2 SHEETS—SHEET 1.
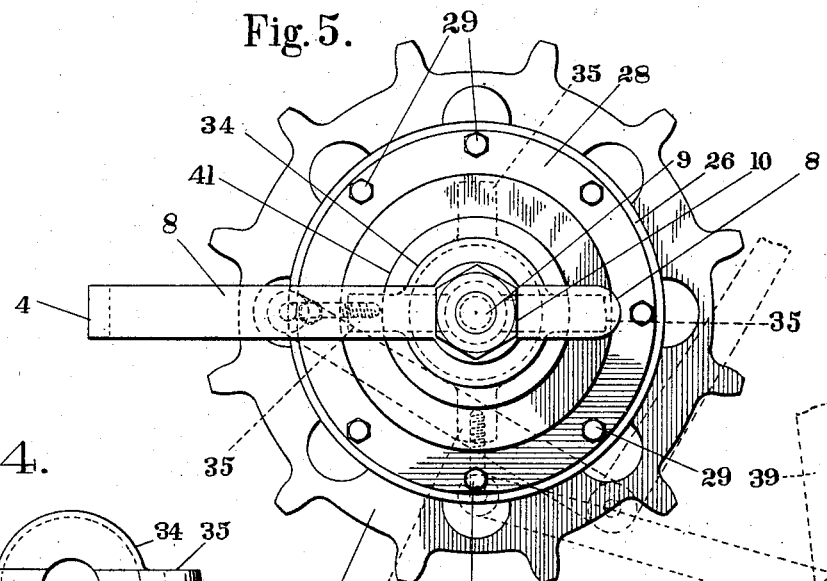
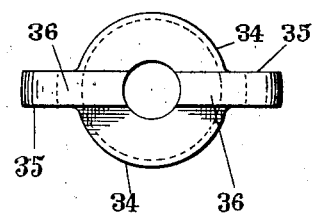
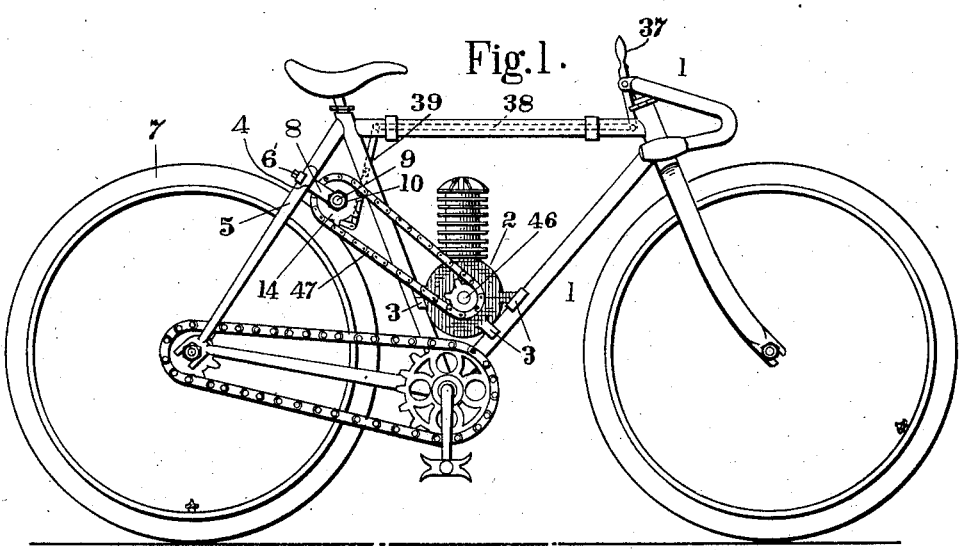
WITNESSES:
Walter A. Greenburg
Anna M. Dow
INVENTOR
Gottlob Belz
BY
ATTORNEYS G. BELZ.
MOTOR ATTACHMENT FOR BICYCLES.
APPLICATION FILED AUG. 17, 1908.
928,928.
Patented July 27, 1909.
2 SHEETS—SHEET 2.
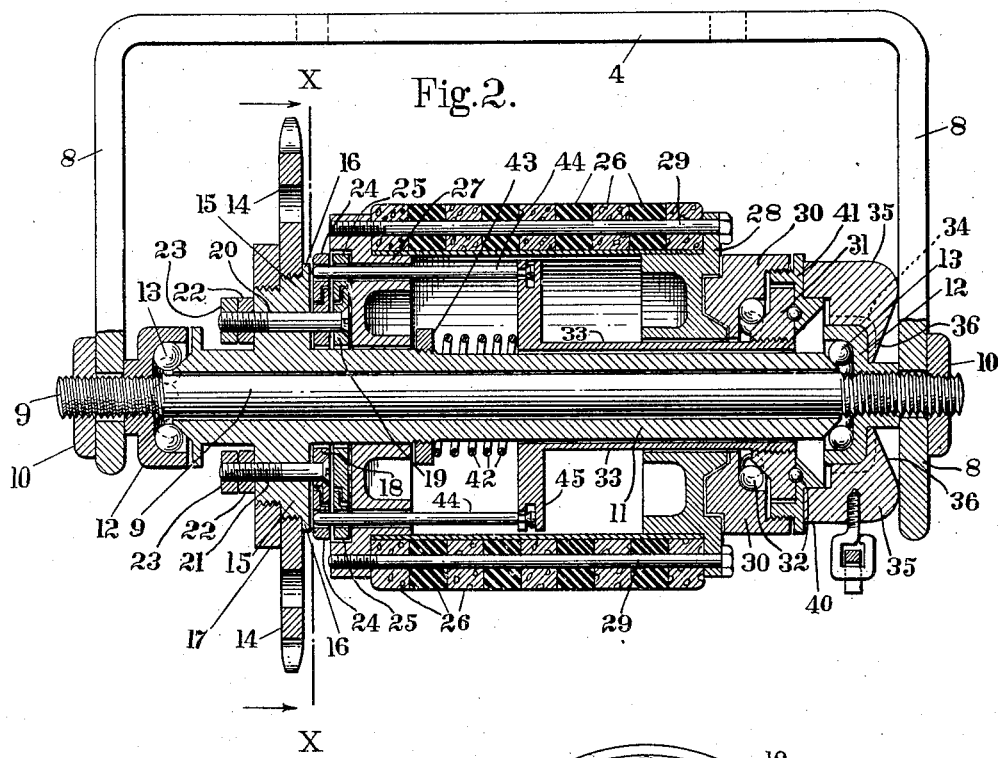
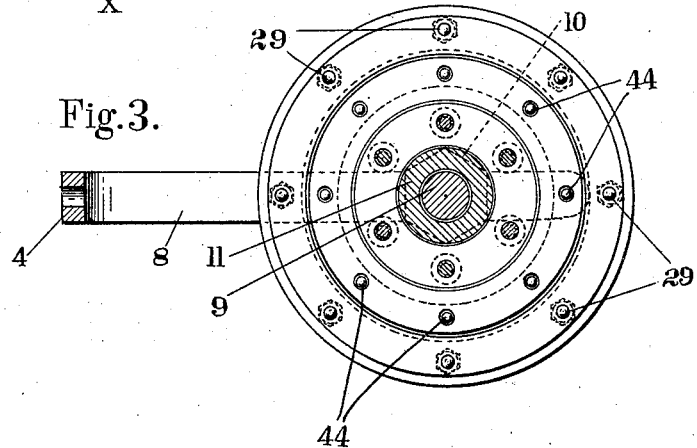
WITNESSES:
Walter A. Greenburg
Anna M. Doss
INVENTOR
Gottlob Belz
BY
ATTORNEYS

UNITED STATES PATENT OFFICE.

GOTTLOB BELZ, OF DETROIT, MICHIGAN.

MOTOR ATTACHMENT FOR BICYCLES.

No. 928,928.  Specification of Letters Patent.  Patented July 27, 1909.

Application filed August 17, 1908. Serial No. 448,906.

*To all whom it may concern:*

Be it known that I, GOTTLOB BELZ, a citizen of the United States of America, residing at Detroit, in the county of Wayne and State of Michigan, have invented certain new and useful Improvements in Motor Attachments for Bicycles, of which the following is a specification, reference being had therein to the accompanying drawings.
In motor attachments for bicycles, whereby they may be converted into motor cycles, it is necessary to apply the power as near the periphery of the drive or rear wheel as possible in order to obtain the desired torque, as well as the necessary reduction in speed between the motor and wheel. This is accomplished either by placing an extra belt or chain rim on the rear wheel, or more frequently, by holding a rotating drum or roller in frictional engagement with the tire tread itself. The former is impracticable owing to the necessity of changing the wheel frame to accommodate the extra rim. The latter causes injury to the tire as it slips and burns the tire in spots when the motor is started, or else wears into it, cutting away the tread.

This invention relates to a motor attachment for bicycles wherein power is applied directly to the rear tire by means which prevent cutting or burning or other like injury to the tire.

The invention consists in the matters hereinafter set forth, and more particularly pointed out in the appended claims.
In the drawings, Figure 1 is a view in elevation of a bicycle equipped with a motor attachment embodying features of the invention. Fig. 2 is a view in longitudinal section of a transmission roller and clutch.
Fig. 3 is a view in section on line x—x of Fig. 2. Fig. 4 is a view in detail of a clutch releasing member or trip. Fig. 5 is an end view of the transmission mechanism showing means for operating the clutch release.
Referring to the drawings, 1 indicates a bicycle of standard type on which a motor 2 herein shown of the internal combustion type is removably secured, as by clips 3. A yoke 4 is detachably fastened to the rear forks 5 of the bicycle as by clips and bolts 6, above the rear wheel 7, with its arms 8 projecting forward. A spindle 9 extends through apertures near the arm ends, and nuts 10 engaging its screw-threaded ends, hold it in place. A sleeve 11 is journaled on the spindle between end thrust bearings formed by ball-cups 12 longitudinally adjustable on the spindle and balls 13 between them and the beveled ends of the sleeve. A drive or sprocket wheel 14 is suitably secured on the sleeve near one end as by being screw-threaded on a flange 15 on the sleeve against a shoulder 16, a check-collar 17 having screw-threaded engagement with a reduced part of the collar holding the wheel against displacement.

A pair of friction rings 18 and 19 with their margins rabbeted toward the flange 15, are adjustably secured by sets of bolts 20 and 21 passing through the rings and flange, with tightening nuts 22 and check nuts 23 whereby the rings may be independently drawn as tightly to the flange as desired. An inner clutch collar 24 is concentrically adjusted on the friction ring 18, and a similar one 25 is likewise secured on the outer ring 19, the inner margins of the collars being reversely rabbeted to mate the ring margins, whereby the collars may be frictionally gripped by the rings and with more or less force according to the degree to which the adjusting bolts 20 and 21 are set up.

A hollow roller built up of rings 26 of cork, leather, fiber or the like, or of cork and leather alternating as herein indicated, clamped between circular end pieces 27 and 28 by a series of bolts 29, is journaled on the sleeve between the friction ring 19 and an outer ball thrust bearing. The latter is made up, preferably, of an inner cup 30, an outer cone 31 and interposed balls 32. This bearing is carried by a tubular slide 33 which also carries the end piece 28. The slide 33 is reciprocable, so that it may be moved toward the clutch rings by a suitable trip ring 34 riding on the ball cup 12 and having wings 35 with oblique faces 36 which cam against the inner side of the adjacent yoke arm 8 and extended end thereof when turned as by a lever 37, link 38 and rock arm 39 conveniently disposed for the rider. The inturned-ends 40 of the wings bear against a thrust collar 41 abutting the cone 31 and screw-threaded into the rim of the ball cup 30. A spring 42 in compression between the inner end of the slide and a stop 43 adjustably secured on the sleeve, whereby the spring tension may be varied, projects the slide when the trip is released or turned clear of the yoke.

A number of clutch pins 44 parallel to the sleeve are secured at one end to a flange 45 on the end of the slide within the collar, and slide through guide apertures in the roller end piece 27, and are adapted to enter apertures in the friction collars 25 and 24 when the latter turn into alinement with the pins. There may be any number of sets of the clutch drive members or friction rings, and their followers, or clutch collars, proportionate to the work to be done. The drive wheel 14 and alined motor wheel 46 are operatively connected as by a sprocket chain 47, although, obviously, a gear train, bevel gear shaft drive or other means may be used.

In operation, the mechanism is placed on a bicycle with the roller in running contact with the tread of the rear tire. With the clutch disengaged, the bicycle may be driven by the pedals in the usual way. Or the motor may be started and by turning the clutch trip, the pins first enter the outer clutch collar apertures. This rotates the collar which slips through the friction rings but gradually starts the roller, the friction ring pressure being adjusted so that the roller will not slip on the tire, but causei t to gradually turn. The pins are then pushed into locking engagement with the second collar as the speed increases, so that added torque is given the roller until, under increasing momentum, the roller finally rotates in unison with the sprocket. By this arrangement, the tire is not burned or flattened in spots, the friction members slipping instead of the roller, so that there is no damage done the tire. The friction elements may be adjusted to pick up motion as gradually as desired, and in case of any sudden, positive stopping of the bicycle, they give without permitting the roller to turn or slide on the tire.

The mechanism, while especially adaptable for attachment to a bicycle, is very effective in any transmission system where it is advisable to prevent sudden stoppage or checking of any member of the train.

Obviously, changes in the details of construction may be made without departing from the spirit of the invention and I do not care to limit myself to any particular form or arrangement of parts.

What I claim as my invention is:—

1. The combination of a bicycle, with a motor adapted to be detachably secured to the bicycle frame, a rotatable member adapted to be secured in rolling contact with a tire of the bicycle, a friction clutch having a set of drive members positively coupled to the motor, a set of follower members each in frictional engagement with a drive member and means adapted to detachably interlock the rotatable member with one or more of the follower members, and means positively coupling the motor and clutch drive members.

2. The combination of a bicycle with a yoke adapted to be detachably secured to the bicycle frame, a roller journaled therein in peripheral contact with a wheel tread, a clutch having drive members, follower members each in constant frictional engagement with a drive member and locking members adapted to detachably interlock the roller and the follower members, and means detachably secured on the bicycle adapted to rotate the clutch drive members.

3. In a motor attachment for bicycles, a yoke adapted to be detachably secured to the frame of a bicycle, a spindle secured therein, a sleeve journaled on the spindle, drive rings secured on the sleeve, collars each in frictional engagement with a ring, a roller journaled on the sleeve, means in the roller adapted to interlock with one or more of the collars, and means for rotating the sleeve.

4. In a motor attachment for bicycles, a yoke adapted to be detachably secured to the frame of a bicycle, a spindle secured therein, a sleeve journaled on the spindle, friction rings non-rotatably secured on the sleeve, friction collars each concentrically secured on a ring with its inner margin having lateral frictional engagement with the outer marginal portion of the ring, a roller journaled on the sleeve adjacent the rings, means adapted to detachably interlock the roller with one or more of the collars, and means for rotating the sleeve.

5. In a motor attachment for bicycles, a yoke adapted to be detachably secured to the frame of a bicycle, a spindle secured therein, a sleeve journaled on the spindle, a flange near one end of the sleeve, friction rings each secured on the sleeve by bolts passing therefrom through the flange, friction collars each concentrically secured on a ring with its inner margin having lateral frictional engagement with the outer marginal portion of the ring, a roller journaled on the sleeve adjacent the rings, means adapted to detachably interlock the roller with one or more of the collars, and means for rotating the sleeve.

6. In a motor attachment for bicycles, a yoke adapted to be detachably secured to the frame of a bicycle, a spindle secured therein, a sleeve journaled on the spindle, a flange near one end of the sleeve, friction rings each secured on the sleeve by bolts passing therefrom through the flange and each having a rabbeted outer rim, a friction collar concentrically secured on each ring having an inner rabbeted peripheral margin mating the ring rim, a roller journaled in the sleeve adjacent the rings, means adapted to detachably interlock the roller with one or more of the collars, and means for rotating the sleeve.

7. The combination with the frame and wheels of a bicycle of a motor adapted to be detachably secured to the frame, a yoke detachably secured to the frame near one of the wheels, a roller journaled in the yoke in rolling contact with the wheel tread, a clutch journaled in the yoke having drive members and follower members in constant frictional engagement with the drive member, members adapted to interlock the roller and one or more of the clutch follower members, means detachably secured on the bicycle for operating the interlocking members, and driving mechanism coupling the motor and clutch drive members.

8. The combination with the frame and wheels of a bicycle of a motor on the frame, a yoke thereon, a clutch sleeve rotatable in the yoke, a flange on the sleeve, a drive wheel secured on the flange, friction rings on the sleeve having rabbeted outer rims, adjustable means independently securing each ring to the flange, friction collars each concentrically secured on a ring and provided with an inner rabbeted peripheral margin mating with the ring rim, a roller journaled in the sleeve adjacent the rings, clutch pins longitudinally reciprocable in the roller parallel to the sleeve adapted to enter apertures in the collars, a slide longitudinally reciprocable on the sleeve engaged by the pins, a trip adapted to move the slide, and driving connections between the motor and sleeve drive wheel.

9. The combination with the frame and wheels of a bicycle, of a motor on the frame, a yoke on the frame, a spindle in the yoke, a clutch sleeve rotatable on the spindle between end thrust ball bearings, a flange on the sleeve, a drive wheel thereon, friction rings on the sleeve having outer rabbeted rims, a set of bolts adjustably securing each ring to the flange, an apertured friction collar on each ring having an inner rabbeted margin mating with the ring rim, a hollow roller in contact with a wheel tread having one apertured end piece journaled on the sleeve adjacent the rings, a tubular slide on the sleeve extending through the other end piece of the roller, clutch pins secured at one end to the slide, extending through the apertures in the adjacent roller end and adapted to enter the collar apertures, an adjustable stop on the sleeve, a spring in compression between the stop and slide adapted to project the slide, a trip ring oscillatory on the spindle between the slide and yoke adapted to move the slide toward the rings when turned, means on the frame for turning the trip, and driving connections between the sleeve drive wheel and motor.

In testimony whereof I affix my signature in presence of two witnesses.

GOTTLOB BELZ.

Witnesses:
C. R. STICKNEY,
A. M. DORR.